United States Patent
Chai et al.

(10) Patent No.: US 9,697,513 B2
(45) Date of Patent: Jul. 4, 2017

(54) USER TERMINAL AND PAYMENT SYSTEM

(75) Inventors: Hongfeng Chai, Shanghai (CN); Zhijun Lu, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 845 days.

(21) Appl. No.: 14/114,740

(22) PCT Filed: May 4, 2012

(86) PCT No.: PCT/CN2012/075075
§ 371 (c)(1),
(2), (4) Date: Jan. 27, 2014

(87) PCT Pub. No.: WO2012/149907
PCT Pub. Date: Nov. 8, 2012

(65) Prior Publication Data
US 2014/0164252 A1    Jun. 12, 2014

(30) Foreign Application Priority Data
May 4, 2011  (CN) .......................... 2011 1 0114402

(51) Int. Cl.
G06Q 20/32 (2012.01)
G07F 7/10 (2006.01)
(Continued)

(52) U.S. Cl.
CPC ......... G06Q 20/3227 (2013.01); G06F 21/31 (2013.01); G06F 21/83 (2013.01);
(Continued)

(58) Field of Classification Search
USPC ..................................... 235/380; 705/41, 72
See application file for complete search history.

(56) References Cited

U.S. PATENT DOCUMENTS

| 5,844,497 A | 12/1998 | Gray |
| 2005/0160050 A1* | 7/2005 | Payne .................. G06Q 20/382 |
| | | 705/64 |

(Continued)

FOREIGN PATENT DOCUMENTS

| CN | 101166180 A | 4/2008 |
| CN | 101394615 A | 3/2009 |

(Continued)

OTHER PUBLICATIONS

English Translation of a Chinese Office Action, Chinese Application No. 201110114402.0.
(Continued)

Primary Examiner — Allyson Trail
(74) Attorney, Agent, or Firm — Blakely Sokoloff Taylor & Zafman LLP

(57) ABSTRACT

The invention provides a user terminal and a payment system. The user terminal comprises an input device, a multi-channel selection switch, an application module, a processor, a password processing module, and a security IC chip containing information on user's ID and/or banking card therein, wherein the multi-channel selection switch is coupled with the input device, the password processing module and the processor, the password processing module is coupled with the processor, and the security IC chip is coupled with the password processing module; the application module controls the multi-channel selection switch via the processor so as to place the user terminal in a password input mode or in a normal input mode. The invention ensures the safety in entering the user's password in hardware configuration so that even when software system of the user terminal is not safe in itself, the safety of input password can be ensured.

9 Claims, 3 Drawing Sheets

(51) Int. Cl.
G06Q 20/40 (2012.01)
G06Q 20/38 (2012.01)
H04L 9/32 (2006.01)
G06F 21/31 (2013.01)
G06F 21/83 (2013.01)

(52) U.S. Cl.
CPC ......... *G06Q 20/32* (2013.01); *G06Q 20/3821* (2013.01); *G06Q 20/4012* (2013.01); *G07F 7/1025* (2013.01); *H04L 9/3215* (2013.01); *H04L 9/3226* (2013.01); *H04L 2209/56* (2013.01); *H04L 2209/805* (2013.01)

(56) References Cited

U.S. PATENT DOCUMENTS

| | | | | |
|---|---|---|---|---|
| 2006/0174147 | A1* | 8/2006 | Uehara | G06F 1/3203 713/320 |
| 2007/0181675 | A1* | 8/2007 | Drummond | G06K 7/0004 235/381 |
| 2008/0005585 | A1* | 1/2008 | Shen | G06F 12/1416 713/186 |
| 2009/0249462 | A1 | 10/2009 | Chhabra | |
| 2009/0307142 | A1* | 12/2009 | Mardikar | G06Q 20/1085 705/72 |
| 2009/0327697 | A1 | 12/2009 | Liu | |
| 2011/0214158 | A1* | 9/2011 | Pasquero | G06F 21/35 726/2 |
| 2012/0143752 | A1* | 6/2012 | Wong | G06Q 20/105 705/41 |
| 2012/0198548 | A1* | 8/2012 | Chen | G06K 19/07716 726/19 |
| 2012/0306754 | A1* | 12/2012 | Jeong | G06F 3/04886 345/168 |
| 2015/0161600 | A1* | 6/2015 | Kahan | G06F 3/04886 705/39 |

FOREIGN PATENT DOCUMENTS

| | | |
|---|---|---|
| EP | 0 587 375 A2 | 3/1994 |
| EP | 0 827 318 A2 | 3/1998 |
| JP | 2002150247 | 5/2002 |
| JP | 2006139489 | 6/2006 |
| JP | 2007334644 | 12/2007 |
| JP | 2009545065 | 12/2009 |
| WO | WO-2004006194 | 1/2004 |

OTHER PUBLICATIONS

English Translation of a Chinese Search Report, dated Apr. 24, 2014, Chinese Application No. 201110114402.0.

Japanese Office Action with English Language Translation, dated Apr. 27, 2015, Japanese Application No. 2014-508679.

Liu, Heqing, "Research and Design of Secure Electronic Payment Terminal," China Master's Theses Full-text Database, Information Technology vol., Nov. 2009, pp. 24-26, 43-44.

* cited by examiner

USER TERMINAL AND PAYMENT SYSTEM

FIELD OF THE INVENTION

The present invention relates to a user terminal and a payment system, and in particular, to a user terminal and a payment system for ensuring payment safety.

BACKGROUND

Demands on password protection in cell phone payment become increasingly higher and higher as payment with cell phone prevails. In payment with a cell phone, a security IC chip is generally used to store information on user's ID or bank card, to verify the input password and to generate encrypted payment information, so as to ensure the safety of payment.

FIG. 1 shows a schematic structural view of an existing payment cell phone. As shown in the figure, the payment cell phone comprises an input device 10, a cell phone CPU 11 and a security IC chip 12.

Typically, information exchange between IC chip and outside is accomplished through executing command-response. Various commands provided by IC chip are the only one legitimate means for interacting between outside and the IC card. IC applied commands refer to those commands that fit demands on such type of IC chip communication interface.

Users enter a password via the input device 10 and cell phone CPU 11 processes the password, and afterward an IC applied command containing the password is sent to the security IC chip.

Conventionally, two ways are adopted for the security IC chip to process the IC applied commands:

First way: The security IC chip acquires a payment password according to the IC applied command and encrypts the payment password, and then the cell phone CPU 11 uses communication interface (not shown) of the cell phone system to send the encrypted password to a bank server for verifying the payment password.

Second way: The security IC chip acquires a payment password according to the IC applied command and makes a comparison between the acquired payment password and another payment password that has been stored in advance in the IC chip so as to verify the correctness of the payment password. After the verification is approved, other cryptographic keys in the IC chip are used to encrypt and sign the payment information that is transmitted previously by payment software. Then, the cell phone CPU 11 uses the communication interface (not shown) of the cell phone system to send the encrypted and signed payment information to bank server for verifying the legality of the payment information.

However, the above ways is equivalent to physically place the user's ID information or the band card information at the cell phone terminal. When the operating system of the cell phone is completely controlled by malicious software, leakage of password will occur since the password can be captured by malicious software in the course of entering the password.

When the malicious software has acquired the password, it can actively conduct payment transactions since the user's ID information or the band card information contained in the IC chip is not physically removed from the cell phone. Therefore, the safety of payment cannot be guaranteed.

SUMMARY OF THE INVENTION

The object of the invention is to provide a user terminal and a payment system for ensuring safety of payment.

The present invention provides following technical solutions:

Solution 1: a user terminal comprises an input device, a multi-channel selection switch, an application module, a processor, a password processing module, and a security IC chip containing the information on user's ID and/or banking card therein, wherein the multi-channel selection switch is coupled with the input device, the password processing module and the processor, the password processing module is coupled with the processor, and the security IC chip is coupled with the password processing module;

the application module controls the multi-channel selection switch via the processor so as to enable the user terminal to switch between a password input mode and a normal input mode; when in the password input mode, data from the input device is sent to the password processing module and is then sent to the security IC chip after being processed by the password processing module, the processor and the application module; and when in the normal input mode, input data from the input device is sent to the processor for processing.

Technical solution 2: a user terminal comprises an input device, a multi-channel selection switch, an application module, a processor, a password processing module, and an IC card seat, wherein the multi-channel selection switch is coupled with the input device, the password processing module and the processor, the password processing module is coupled with the processor, and the IC card seat is coupled with the password processing module;

the application module controls the multi-channel selection switch via the processor so as to enable the user terminal to switch between a password input mode and a normal input mode; when in the password input mode, data from the input device is sent to the password processing module and is then sent to the IC card seat after being processed by the password processing module, the processor and the application module; and when in the normal input mode, input data from the input device is sent to the processor for processing.

Preferably, in the technical solution 1 or 2 of the invention, a state indicator is also included, which is coupled with the multi-channel selection switch and used for indicating current input mode of the user terminal according to the state of the multi-channel selection switch.

Preferably, in the technical solution 1 or 2 of the invention, the multi-channel selection switch determines whether the time interval between the two latest continuous switches between input modes is greater than a predetermined time interval. When the predetermined time interval is not exceeded, the multi-channel selection switch does not perform the switching.

Preferably, in the technical solution 1 or 2 of the invention, when in the password input mode, the password processing module determines whether input data from the input device is password data or operation data:

if the input data is password data, placeholder information is sent to the application module via the processor and the password data are stored into the password processing module, and the process returns to the step of determining;

if the input data is operation data, it is further determined whether it is completion data; if not, the operation data is sent to the application module via the processor so that the application module conducts corresponding operations and the process returns to the step of determining, and meanwhile, the password processing module also conducts corresponding operations to the stored password data and stores the processed password data into the password processing module; if yes, the completion data is sent to the application module which then generates a first IC applied command data and sends the first IC applied command data to the password processing module via the processor, the password processing module combines the first IC applied command data and the password data stored in the password processing module to generate a second IC applied command which is then sent to the security IC chip or the IC card seat;

If not, the process returns to the step of determining.

Preferably, in the technical solution 1 or 2 of the invention, the input device is a keyboard.

Preferably, in the technical solution 1 or 2 of the invention, the input device is a touch screen, and information on the layout of keys in a typewriting method of the touch screen is transmitted to the password processing module in advance via the processor by the application module and stored in the password processing module.

Preferably, in the technical solution 1 or 2 of the invention, a display device coupled with the processor is also included for displaying information to be displayed from the processor.

Preferably, in the technical solution 1 or 2 of the invention, the user terminal is selected from a group consisting of cell phone, computer and PDA.

The present invention also provides a payment system characterized by comprising the user terminal in technical solution 2 and a security IC chip mounted in the IC card seat, wherein the security IC chip receives data from the password processing module via the IC card seat.

The technical effects of the present invention lies in that safety in inputting user's password is ensured in terms of the hardware so that even when the software system of the user terminal is not safe in itself, the safety of the input password can still be ensured.

DETAILED DESCRIPTION OF THE INVENTION

Preferred embodiments of the invention will be described in detail hereinafter with reference to the accompanying drawings, in which like elements are denoted by like figure references.

Figure 1:
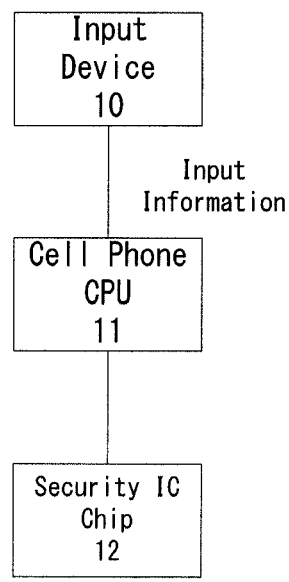
FIG. 1 is a schematic structural view of an existing payment cell phone.
Figure 2:
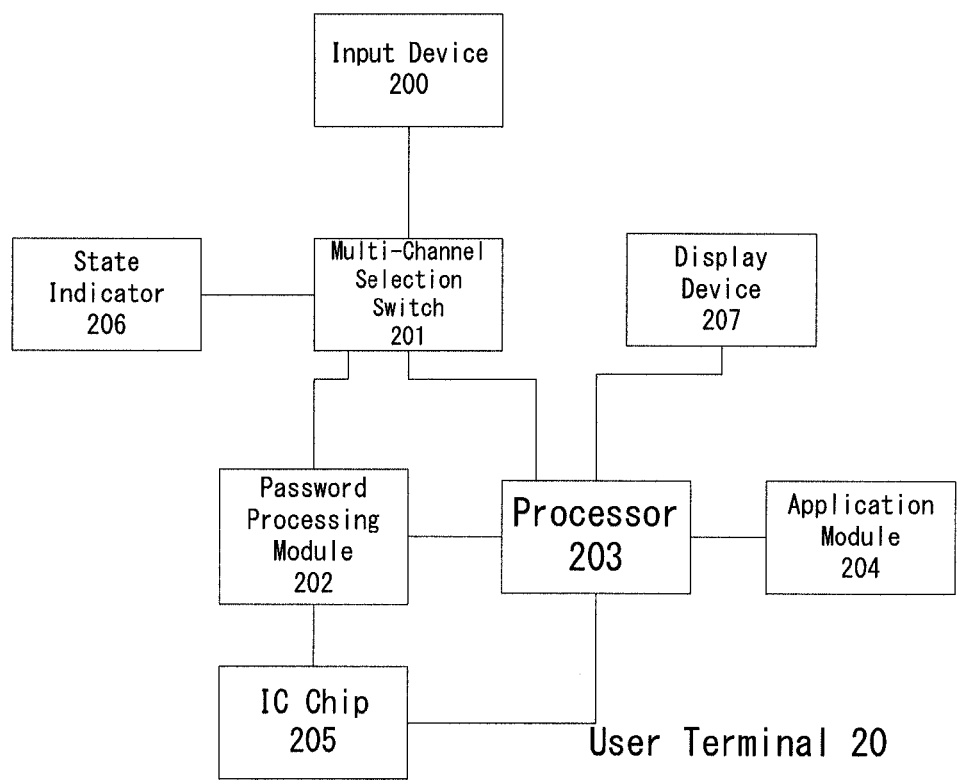
FIG. 2 is a schematic structural view of a user terminal according to a first embodiment of the invention.

FIG. 2 is a schematic structural view of a user terminal according to the first embodiment of the invention. As shown, user terminal 20 comprises an input device 200, a multi-channel selection switch 201, a password processing module 202, a processor 203, a payment application 204 and a security IC chip 205 containing information on user's ID and/or banking card therein. The multi-channel selection switch 201 is coupled with the input device 200, the password processing module 202 and the processor 203, and the password processing module 202 is also coupled with the processor 203 and the security IC chip 205. Application module 204 controls the multi-channel selection switch 201 via the processor 203 so as to enable the user terminal 20 is in a password input mode and a normal input mode; when in the password input mode, the data from the input device 200 is sent to the password processing module 202; while is in the normal input mode, the data from the input device 200 is sent to the processor 203, wherein the password processing module 202 is embodied as a hardware structure.

Preferably, the user terminal 20 further comprises a state indicator 206 which is coupled with the multi-channel selection switch 201. The state indicator 206 is used for indicating the current input mode of the user terminal 20 according to the state of the multi-channel selection switch 201. The state indicator 206 can be but is not limited to an LED light.

Preferably, the multi-channel selection switch 201 determines whether the time interval between two latest continuous switches between input modes is greater than a predetermined time interval. When the predetermined time interval is not exceeded, the multi-channel selection switch 201 does not perform the switching so that the user terminal 20 maintains the current mode. Meanwhile and optionally, the multi-channel selection switch 201 may send relevant information to the processor 203 in order to warn the user.

By means of the above process of determining performed by the multi-channel selection switch 201, it is ensured that the state indicated by the state indicator 206 seen by the user will not be confused due to the very frequent switch performed by the software system, and thus avoiding an erroneous input of payment password by the user in the normal input mode.

Preferably, the user terminal 20 further comprises a display device 207 coupled with the processor 203 for displaying information to be displayed from the processor 203.

Preferably, the display device 207 and the input device 200 can be integrated into one body.

The operational principle of the payment system of the invention will be described in detail hereinafter.

The application module 204 controls the multi-channel selection switch 201 via the processor 203 so as to enable the user terminal 20 to switch between a password input mode and a normal input mode. For example, when a user accesses an on-line shop for shopping via the user terminal 20 and chooses to make the payment via the user terminal 20, the application module 204 is activated and controls the multi-channel selection switch 201 via the processor 203 so as to currently place the user terminal 20 in the password input mode. At this time, the data from the input device 200 is sent to the password processing module 202. When password input is completed, the application module 204 switches the multi-channel selection switch 201 via the processor 203 so as to place the user terminal 20 in the normal input mode in which the data from the input device 200 is sent to the processor 203 for processing.

Preferably, the multi-channel selection switch 201 simultaneously sends a corresponding signal to the state indicator 206 so that the state indicator 206 indicates the current mode of the user terminal 20. Exemplary ways of indicating include but are not limited to:

For example, in case that the state indicator 206 is an LED light, when the user terminal 20 is in the password input mode, the LED light is turned on; and when the user terminal 20 is in the normal input mode, the LED light is turned off; or For example, in case that the state indicator 206 comprises a plurality of LED lights, e.g., a red LED light and a green LED light, when the user terminal 20 is in the password input mode, the red LED light is turned on; and when the user terminal 20 is in the normal input mode, the green LED light is turned on.

Alternatively, the multi-channel selection switch 201 can also send a signal to the display device 207 for displaying the current mode of the user terminal 20 on the display device 207 in word text or other forms.

Then above described ways of indicating the current mode of the user terminal are exemplary only, and those skilled in the art can make variations thereto as actually required without going beyond the protection scope of the invention.

When in the password input mode, the password processing module 202 determines whether input data from the input device 200 is password data or operation data.

If the input data are password data, the password processing module 202 generates placeholder information and sends the placeholder information to the application module 204 via processor 203 and stores the password data into the password processing module 202, and the process returns to the above step of determining. In this step, the password data actually input (including but not limited to word letters and numerals) is not sent to the processor 203; rather, only the placeholder information is sent, wherein the placeholder information is for example a star symbol (*) but without limited thereto.

Alternatively, the password processing module 202 sends a signal indicating that the input data are password data to the processor 203 and the processor 203 generates placeholder information and sends it to the application module 204. In this case, since password data actually input are not sent to the processor 203, safety of the user payment is ensured.

If the input data are operation data, it is further determined whether it is the completion data. The operation data can be valid auxiliary input for indicating the intended operations to the password data by the user, including but not limited to deletion, left shift, right shift and completion.

If the operation data are not the completion data, the operation data are sent to the application module 204 via processor 203 so that the application module 204 conducts corresponding operations and the process returns to the step of determining. Meanwhile, the password processing module also conducts corresponding operations to the stored password data and stores the processed password data into the password processing module. If the operation data are completion data, the completion data is sent to the application module 204 which then generates a first IC applied command data and sends the first IC applied command data to the password processing module 202 via the processor 203. Meanwhile, the application module 204 controls the multi-channel selection switch 201 via the processor 203 so as to switch the user terminal 20 into the normal input mode. The password processing module 202 combines the first IC applied command data and the password data stored in the password processing module 202 to generate a second IC applied command which is then sent to the security IC chip 205. The generation of IC applied command is a common knowledge for those skilled in the art and is therefore not described hereinafter.

When the IC chip 21 receives the second IC applied command, it processes the second IC applied command and sends the processed information to the processor 203 for conducting subsequent operations and payment. The processing of the IC applied command and the process of making payment by the processor are a common knowledge for those skilled in the art and are therefore not described hereinafter.

If the input data are not valid password data or valid operation data, the process returns to the step of determining.

Preferably, the password processing module 202 can also send warning information to the processor 203 for warning the user to input valid data.

When the user terminal 20 is in the normal input mode, i.e., it is not required for the user to input the password. In this situation, the input mode of the user terminal 20 and that of existing user terminal are consistent, and input data from the input device 200 are directly sent to the processor 203.

In the user terminal of the present invention, when it is required for the user to enter a password, the user terminal is switched to the password input mode via the multi-channel selection switch 201 so that the password entered by the user will not be sent to the processor 203 and but to the password processing module 202 of a hardware configuration. Therefore, even if the operating system of the user terminal is completely controlled by a malicious software, it is impossible for the malicious software to capture password entered by user, thus safety in entering the user's password is ensured because of the hardware.

Preferably, the user terminal 20 may be but not limited to a cell phone, a computer or PDA.

Preferably, the application module 204 may be but not limited to a payment application software.

Preferably, the input device 200 is a keyboard.

Preferably, the input device 200 is a touch screen, and information on the layout of keys in typewriting method of the touch screen is stored in the password processing module 202 in advance and the password processing module 202, in response to the information on the layout of keys in typewriting method of the touch screen, transforms key coordinate information output by the input device into corresponding data information.

Figure 3:
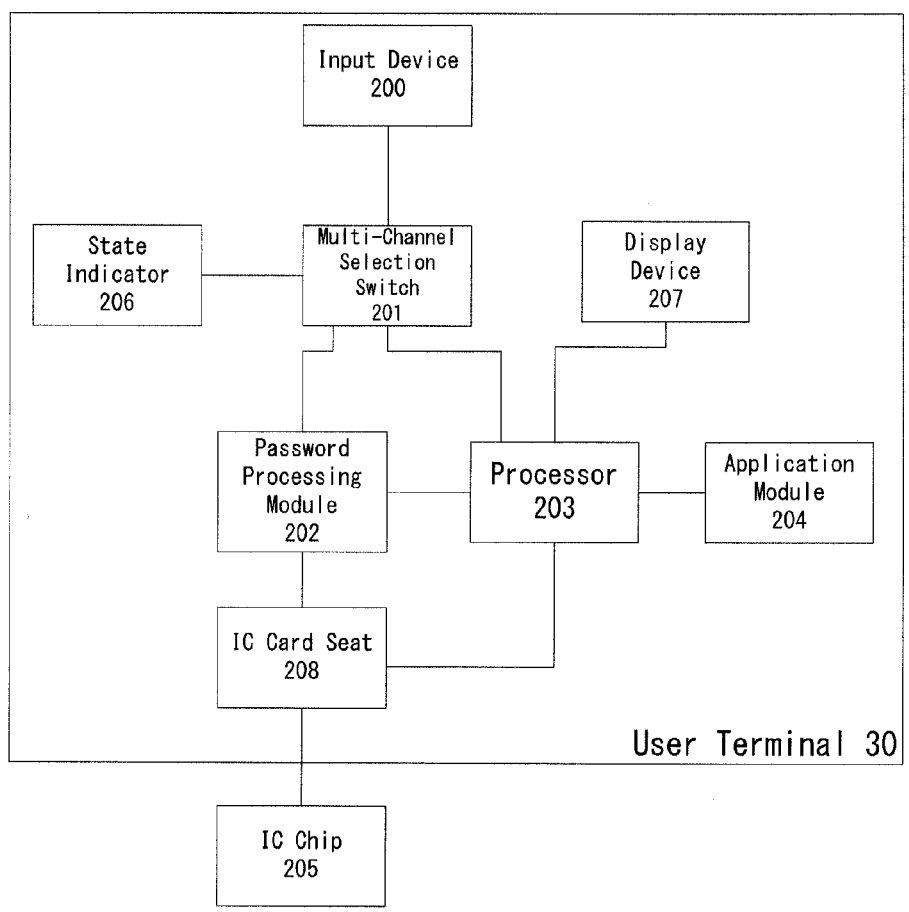
FIG. 3 is a schematic structural view of a payment system according to a second embodiment of the invention.

FIG. 3 is a schematic structural view of a payment system according to a second embodiment of the invention.

The payment system comprises a user terminal 30 and a security IC chip 205 mounted in an IC card seat 208 of the user terminal 30. The user terminal 30 differs from the user terminal 28 in that the user terminal 30 comprises the IC card seat 208, but does not comprise the security IC chip 205.

In the second embodiment, the security IC chip 205 receives the IC applied command from the password processing module 202, via the IC card seat 208, processes the command and sends the processed information to the processor 203 via the IC card seat 208 for subsequent operations and payment by the processor 203.

In light of the above teaching, those skilled in the art can readily envisage other embodiments, combinations and modifications of the invention. Therefore, the present invention is defined merely by the appended claims when read in connection with the above description and accompanying drawings.

The invention claimed is:

1. A user terminal, comprising an input device, a multi-channel selection switch, an application module, a processor, a password processing module, and a security IC chip containing information on user's ID and/or banking card therein, wherein the multi-channel selection switch is coupled with the input device, the password processing module and the processor, the password processing module is coupled with the processor, and the security IC chip is coupled with the password processing module;

the application module controls the multi-channel selection switch via the processor so as to enable the user terminal to switch between a password input mode and a normal input mode; when in the password input mode, data from the input device are sent to the password processing module, and then sent to the security IC chip after being processed by the password processing module, the processor and the application module; and when in the normal input mode, the input data from the input device is sent to the processor for processing, wherein the multi-channel selection switch determines whether a time interval between the two latest continuous switches between the input modes is greater than a predetermined time interval, and when the predetermined time interval is not exceeded, the multi-channel selection switch does not perform the switching.

2. A user terminal, comprising an input device, a multi-channel selection switch, an application module, a processor, a password processing module, and an IC card seat therein, wherein the multi-channel selection switch is coupled with the input device, the password processing module and the processor, the password processing module is coupled with the processor, and the IC card seat is coupled with the password processing module;

the application module controls the multi-channel selection switch via the processor so as to enable the user terminal to switch between a password input mode and a normal input mode; when in the password input mode, data from the input device is sent to the password processing module and then sent to the IC card seat after being processed by the password processing module, the processor and the application module; and when in the normal input mode, the input data from the input device is sent to the processor for processing, wherein the multi-channel selection switch determines whether a time interval between the two latest continuous switches between the input modes is greater than a predetermined time interval, and when the predetermined time interval is not exceeded, the multi-channel selection switch does not perform the switching.

3. The user terminal according to claim 1 or 2, further comprising a state indicator which is coupled with the multi-channel selection switch and used for indicating the current input mode of the user terminal according to the state of the multi-channel selection switch.

4. The user terminal according to claim 1 or 2, wherein when in the password input mode, the password processing module determines whether the input data from the input device are password data or operation data:

if the input data are password data, the processor sends placeholder information to the application module and stores the password data to the password processing module, and the process returns to the above step of determining;

if the input data are operation data, it is further determined whether it is completion data; if not, the processor sends the operation data to the application module to enable corresponding operations to the operation data and the process returns to the step of determining, and meanwhile, the password processing module also conducts corresponding operations to the stored password data and stores the processed password data into the password processing module; if the operation data are completion data, the completion data are sent to the application module which then generates a first IC applied command data and sends the first IC applied command data to the password processing module via the processor, the password processing module combines the first IC applied command data and the password data stored in the password processing module to generate a second IC applied command which is then sent to the security IC chip or IC card seat;

if not, the process returns to the step of determining.

5. The user terminal according to claim 1 or 2, wherein the input device is a keyboard.

6. The user terminal according to claim 1 or 2, wherein the input device is a touch screen, and information on layout of keys in typewriting method of the touch screen is transmitted to the password processing module in advance via the processor by the application module and stored in the password processing module.

7. The user terminal according to claim 1 or 2, further comprising a display device coupled with the processor for displaying the information to be displayed from the processor.

8. The user terminal according to claim 1 or 2, wherein the user terminal is selected from a group consisting of cell phones, computers and PDA.

9. A payment system, comprising the user terminal according to claim 2 and a security IC chip mounted in the IC card seat, wherein the security IC chip receives the data from the password processing module via the IC card seat.

* * * * *

UNITED STATES PATENT AND TRADEMARK OFFICE
CERTIFICATE OF CORRECTION

| | |
|---|---|
| PATENT NO. | : 9,697,513 B2 |
| APPLICATION NO. | : 14/114740 |
| DATED | : July 4, 2017 |
| INVENTOR(S) | : Hongfeng Chai, Zhijun Lu and Shuo He |

It is certified that error appears in the above-identified patent and that said Letters Patent is hereby corrected as shown below:

On the Title Page

In Item (56) under References Cited, under Foreign Patent Documents, on Page 2, Column 2, under the last entry, please insert --WO 98/09209--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*